(12) United States Patent
Ignatiev et al.

(10) Patent No.: US 11,585,608 B2
(45) Date of Patent: Feb. 21, 2023

(54) CLIMATE-CONTROL SYSTEM HAVING THERMAL STORAGE TANK

(71) Applicant: Emerson Climate Technologies, Inc., Sidney, OH (US)

(72) Inventors: Kirill M. Ignatiev, Sidney, OH (US); Michael M. Perevozchikov, Tipp City, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 16/245,641

(22) Filed: Jan. 11, 2019

(65) Prior Publication Data

US 2019/0242657 A1    Aug. 8, 2019

Related U.S. Application Data

(60) Provisional application No. 62/626,367, filed on Feb. 5, 2018.

(51) Int. Cl.
*F28D 20/02* (2006.01)
*F24F 5/00* (2006.01)
(Continued)

(52) U.S. Cl.
CPC .......... *F28D 20/021* (2013.01); *F24D 11/02* (2013.01); *F24F 3/065* (2013.01); *F24F 5/0021* (2013.01);
(Continued)

(58) Field of Classification Search
CPC .... F28D 20/021; F28D 1/0417; F28D 1/0435; F28D 7/0075; F28D 7/16; F24D 11/02;
(Continued)

(56) References Cited

U.S. PATENT DOCUMENTS 2,793,506 A     5/1957 Moody
2,911,513 A  * 11/1959 MacCracken ......... F24H 7/0233
                                                            392/341
(Continued)

FOREIGN PATENT DOCUMENTS

CH         703290 A1    12/2011
CN        1385659 A     12/2002
(Continued)

OTHER PUBLICATIONS

DE102008049954A1 mt (Year: 2010).*
(Continued)

*Primary Examiner* — Gordon A Jones
(74) *Attorney, Agent, or Firm* — Harness, Dickey & Pierce, P.L.C.

(57) ABSTRACT

A climate-control system may include a first working fluid circuit, a second working fluid circuit and a storage tank. The first working fluid circuit includes a first compressor and a first heat exchanger in fluid communication with the first compressor. The second working fluid circuit includes a second compressor and a second heat exchanger in fluid communication with the second compressor. The storage tank contains a phase-change material. The first working fluid circuit and the second working fluid circuit are thermally coupled with the phase-change material contained in the storage tank.

19 Claims, 2 Drawing Sheets

(51) Int. Cl.
   *F28D 1/04* (2006.01)
   *F24F 13/30* (2006.01)
   *F24D 11/02* (2006.01)
   *F28D 7/00* (2006.01)
   *F28D 7/16* (2006.01)
   *F24F 3/06* (2006.01)

(52) U.S. Cl.
   CPC .......... *F24F 13/30* (2013.01); *F28D 1/0417* (2013.01); *F28D 1/0435* (2013.01); *F28D 7/0075* (2013.01); *F28D 7/16* (2013.01)

(58) Field of Classification Search
   CPC .......... F24F 3/065; F24F 3/0021; F24F 13/30; F24F 5/0021
   See application file for complete search history.

(56) References Cited

U.S. PATENT DOCUMENTS

| | | | |
|---|---|---|---|
| 3,733,845 A * | 5/1973 | Lieberman | F25B 7/00 62/502 |
| 3,782,132 A | 1/1974 | Off | |
| 4,041,724 A * | 8/1977 | Gustafsson | F25B 29/003 62/175 |
| 4,119,143 A * | 10/1978 | Robinson, Jr. | F24D 11/003 165/10 |
| 4,122,688 A * | 10/1978 | Mochizuki | F25B 5/02 62/278 |
| 4,196,595 A * | 4/1980 | Shaw | F04C 28/125 62/503 |
| 4,209,998 A | 7/1980 | Shaw | |
| 4,327,560 A | 5/1982 | Leon et al. | |
| 4,380,156 A | 4/1983 | Ecker | |
| 4,391,104 A * | 7/1983 | Wendschlag | F24D 5/12 62/79 |
| 4,532,854 A | 8/1985 | Foster | |
| 4,696,338 A * | 9/1987 | Jensen | F28D 20/025 165/104.17 |
| 4,899,555 A | 2/1990 | Shaw | |
| 4,945,733 A | 8/1990 | LaBrecque | |
| 4,947,655 A | 8/1990 | Shaw | |
| 5,042,268 A | 8/1991 | LaBrecque | |
| 5,095,712 A | 3/1992 | Narreau | |
| 5,103,650 A | 4/1992 | Jaster | |
| 5,235,820 A | 8/1993 | Radermacher et al. | |
| 5,241,829 A | 9/1993 | Irie et al. | |
| 5,261,251 A | 11/1993 | Galiyano | |
| 5,347,831 A | 9/1994 | Kitaguchi et al. | |
| 5,383,339 A | 1/1995 | McCloskey et al. | |
| 5,400,609 A | 3/1995 | Sjoholm et al. | |
| 5,408,836 A | 4/1995 | Sjoholm et al. | |
| 5,410,889 A | 5/1995 | Sjoholm et al. | |
| 5,729,994 A | 3/1998 | Mlukaiyama et al. | |
| 5,894,739 A * | 4/1999 | Temos | F25B 7/00 62/436 |
| 6,053,715 A | 4/2000 | Hirano et al. | |
| 6,070,421 A | 6/2000 | Petrovich et al. | |
| 6,205,802 B1 * | 3/2001 | Drucker | B60H 1/00371 62/236 |
| 6,220,337 B1 * | 4/2001 | Chen | F28D 20/021 165/10 |
| 6,231,316 B1 | 5/2001 | Wakisaka et al. | |
| 6,629,413 B1 * | 10/2003 | Wendt | F02C 1/04 60/655 |
| 6,758,057 B2 | 7/2004 | Vince, II et al. | |
| 7,096,929 B2 | 8/2006 | Clarksean | |
| 7,147,071 B2 * | 12/2006 | Gering | B60L 58/27 237/12.3 B |
| 7,240,725 B2 * | 7/2007 | Horn | B60H 1/005 165/10 |
| 7,721,562 B2 | 5/2010 | Lifson et al. | |
| 7,874,499 B2 | 1/2011 | Lochtefeld | |
| 8,020,402 B2 | 9/2011 | Pham et al. | |
| 8,091,381 B2 * | 1/2012 | Boiarski | F25B 7/00 62/498 |
| 8,181,470 B2 | 5/2012 | Narayanamurthy et al. | |
| 8,528,345 B2 | 9/2013 | Parsonnet et al. | |
| 8,671,703 B2 | 3/2014 | Mitra et al. | |
| 8,713,963 B2 | 5/2014 | Yanik | |
| 9,212,834 B2 | 12/2015 | Parsonnet et al. | |
| 9,353,980 B2 | 5/2016 | Ignatiev | |
| 9,441,861 B2 | 9/2016 | Diamond et al. | |
| 9,470,435 B2 | 10/2016 | Hinde et al. | |
| 9,599,377 B2 | 3/2017 | Kato | |
| 9,709,302 B2 | 7/2017 | Martin et al. | |
| 9,863,672 B2 * | 1/2018 | Goenka | B60H 1/00478 |
| 9,989,271 B1 * | 6/2018 | Becker | F24F 5/0021 |
| 10,036,580 B2 | 7/2018 | Zha et al. | |
| 10,465,962 B2 | 11/2019 | Ignatiev et al. | |
| 10,598,395 B2 | 3/2020 | Attari et al. | |
| 10,648,714 B2 * | 5/2020 | Van Gysel | F24D 10/00 |
| 10,663,201 B2 | 5/2020 | Hayes | |
| 10,969,165 B2 | 4/2021 | Saunders et al. | |
| 11,014,427 B2 | 5/2021 | Vehr et al. | |
| 2002/0066278 A1 | 6/2002 | Cho et al. | |
| 2002/0174673 A1 | 11/2002 | Wilkinson | |
| 2002/0187050 A1 | 12/2002 | Namey et al. | |
| 2004/0035122 A1 | 2/2004 | Lifson et al. | |
| 2004/0159119 A1 | 8/2004 | Hu | |
| 2005/0061497 A1 * | 3/2005 | Amaral | B60H 1/00278 165/202 |
| 2005/0150248 A1 | 7/2005 | Manole | |
| 2005/0204773 A1 | 9/2005 | Imai et al. | |
| 2005/0235664 A1 | 10/2005 | Pham | |
| 2006/0010904 A1 | 1/2006 | Nieter et al. | |
| 2006/0010907 A1 | 1/2006 | Taras et al. | |
| 2006/0059933 A1 * | 3/2006 | Axakov | B60H 1/32011 62/244 |
| 2008/0034760 A1 | 2/2008 | Narayanamurthy et al. | |
| 2008/0078192 A1 | 4/2008 | Ignatiev et al. | |
| 2008/0078204 A1 | 4/2008 | Ignatiev | |
| 2008/0078542 A1 * | 4/2008 | Gering | F01P 11/20 165/202 |
| 2008/0116289 A1 | 5/2008 | Lochtefeld | |
| 2008/0196877 A1 * | 8/2008 | Zeigler | F25B 13/00 165/202 |
| 2008/0245505 A1 | 10/2008 | Yamaguchi et al. | |
| 2009/0007589 A1 | 1/2009 | Takegami et al. | |
| 2009/0173336 A1 | 7/2009 | Leifer et al. | |
| 2009/0211732 A1 * | 8/2009 | Goenka | B60H 1/00492 165/104.17 |
| 2009/0235678 A1 | 9/2009 | Taras et al. | |
| 2009/0297193 A1 | 12/2009 | Stover et al. | |
| 2010/0071391 A1 | 3/2010 | Lifson et al. | |
| 2010/0077777 A1 | 4/2010 | Lifson et al. | |
| 2010/0083677 A1 | 4/2010 | Lifson et al. | |
| 2010/0083678 A1 | 4/2010 | Lifson et al. | |
| 2010/0115975 A1 | 5/2010 | Mitra et al. | |
| 2010/0132399 A1 | 6/2010 | Mitra et al. | |
| 2010/0139298 A1 | 6/2010 | Lifson et al. | |
| 2010/0199694 A1 | 8/2010 | Taras et al. | |
| 2010/0199715 A1 * | 8/2010 | Lifson | F25B 40/00 62/510 |
| 2010/0263393 A1 | 10/2010 | Chen et al. | |
| 2010/0287934 A1 * | 11/2010 | Glynn | F28D 20/026 60/645 |
| 2011/0023514 A1 | 2/2011 | Mitra et al. | |
| 2011/0048041 A1 | 3/2011 | Asprovski et al. | |
| 2011/0094259 A1 | 4/2011 | Lifson et al. | |
| 2011/0113804 A1 | 5/2011 | Chin et al. | |
| 2011/0135509 A1 | 6/2011 | Fields et al. | |
| 2011/0138825 A1 | 6/2011 | Chen et al. | |
| 2011/0139794 A1 | 6/2011 | Pham et al. | |
| 2011/0144944 A1 | 6/2011 | Pham | |
| 2011/0174014 A1 | 7/2011 | Scarcella et al. | |
| 2011/0232890 A9 | 9/2011 | Gering et al. | |
| 2012/0011866 A1 | 1/2012 | Scarcella et al. | |
| 2012/0117988 A1 | 5/2012 | Mitra et al. | |
| 2012/0167602 A1 | 7/2012 | Taras et al. | |
| 2012/0192579 A1 | 8/2012 | Huff et al. | |
| 2012/0227427 A1 | 9/2012 | Liu et al. | |

(56) References Cited

U.S. PATENT DOCUMENTS

| | | |
|---|---|---|
| 2012/0285185 A1 | 11/2012 | Huff |
| 2012/0318008 A1 | 12/2012 | Liu et al. |
| 2013/0031934 A1 | 2/2013 | Huff et al. |
| 2013/0075076 A1* | 3/2013 | Agostini ............ H05K 7/20945 165/287 |
| 2013/0263623 A1* | 10/2013 | Lee ..................... F25J 1/0085 62/611 |
| 2013/0298593 A1 | 11/2013 | Christensen |
| 2014/0053585 A1 | 2/2014 | Huff |
| 2014/0151015 A1 | 6/2014 | Sun et al. |
| 2014/0190195 A1* | 7/2014 | Muscatell ............ F04C 23/001 62/235.1 |
| 2014/0216102 A1 | 8/2014 | Ignatiev et al. |
| 2014/0326018 A1 | 11/2014 | Ignatiev |
| 2015/0176872 A1 | 6/2015 | Goenka |
| 2015/0330673 A1* | 11/2015 | Honda ................. F25B 25/005 62/324.1 |
| 2015/0345806 A1* | 12/2015 | Hahn ................. F24D 11/0221 62/529 |
| 2016/0010902 A1 | 1/2016 | Andres |
| 2016/0231035 A1 | 8/2016 | Lee et al. |
| 2016/0313057 A1* | 10/2016 | Roberts ................. F25J 1/0202 |
| 2016/0319810 A1* | 11/2016 | Gibbs .................... F04B 49/08 |
| 2017/0058773 A1 | 3/2017 | Vaisman |
| 2017/0074567 A1 | 3/2017 | Ali et al. |
| 2017/0138643 A1 | 5/2017 | Ignatiev et al. |
| 2017/0191727 A1 | 7/2017 | Chae et al. |
| 2017/0198946 A1* | 7/2017 | Takenaka ................. F24F 11/89 |
| 2017/0198950 A1 | 7/2017 | Bresson et al. |
| 2017/0219264 A1 | 8/2017 | Song et al. |
| 2017/0254569 A1 | 9/2017 | Kuroda |
| 2017/0350658 A1* | 12/2017 | Kerth .................... H02K 7/1823 |
| 2017/0370639 A1* | 12/2017 | Bardon ................. F25J 1/0022 |
| 2018/0106517 A1 | 4/2018 | Baltus |
| 2018/0147916 A1* | 5/2018 | Kolda ................. B60H 1/00492 |
| 2018/0209689 A1 | 7/2018 | Ipposhi et al. |
| 2018/0217019 A1 | 8/2018 | Furumoto et al. |
| 2018/0299171 A1* | 10/2018 | Olsen .................... F28F 9/0229 |
| 2018/0347861 A1 | 12/2018 | Wang et al. |
| 2019/0011152 A1 | 1/2019 | Kniffler et al. |
| 2019/0041102 A1 | 2/2019 | Zha et al. |
| 2019/0128568 A1 | 5/2019 | Scarcella et al. |
| 2019/0186801 A1 | 6/2019 | Kopko et al. |
| 2019/0264933 A1 | 8/2019 | Ignatiev et al. |
| 2019/0271491 A1 | 9/2019 | Sishtla et al. |
| 2019/0353361 A1 | 11/2019 | Attari et al. |
| 2019/0353409 A1* | 11/2019 | Warner ................. F25B 25/005 |
| 2019/0360703 A1* | 11/2019 | Franck ................. F24D 19/1042 |
| 2020/0003457 A1 | 1/2020 | Wallis et al. |
| 2020/0124330 A1* | 4/2020 | Hayes .................... F25B 41/04 |
| 2020/0333053 A1* | 10/2020 | Hellmann ............... F25B 43/02 |
| 2021/0048203 A1* | 2/2021 | Melink ................... F24F 5/001 |

FOREIGN PATENT DOCUMENTS

| | | | |
|---|---|---|---|
| CN | 1108501 C | 5/2003 | |
| CN | 101517323 A | 8/2009 | |
| CN | 101688697 A | 3/2010 | |
| CN | 101688698 A | 3/2010 | |
| CN | 101688725 A | 3/2010 | |
| CN | 203364496 U | 12/2013 | |
| CN | 203442998 U | 2/2014 | |
| CN | 104471334 A | 3/2015 | |
| CN | 105004087 A | 10/2015 | |
| CN | 105190197 A | 12/2015 | |
| DE | 102008049954 A1 * | 4/2010 | ............ F24D 3/082 |
| DE | 102010037474 A1 | 1/2012 | |
| EP | 0402131 A2 | 12/1990 | |
| EP | 0402131 B1 | 10/1993 | |
| EP | 1607695 A2 | 12/2005 | |
| FR | 3020130 A1 | 10/2015 | |
| GB | 2017890 A | 10/1979 | |
| GB | 2220256 A | 1/1990 | |
| GB | 2237625 A * | 5/1991 | ............ F25B 30/02 |
| JP | H09310894 A | 12/1997 | |
| JP | 2003050059 A | 2/2003 | |
| JP | 2010216783 A | 9/2010 | |
| JP | 2012167869 A | 9/2012 | |
| KR | 101722384 B1 | 4/2017 | |
| WO | WO-2006015629 A1 | 2/2006 | |
| WO | WO-2007111594 A1 | 10/2007 | |
| WO | WO-2008079128 A1 | 7/2008 | |
| WO | WO-2008140454 A1 | 11/2008 | |
| WO | WO-2009041959 A1 | 4/2009 | |
| WO | WO-2009098899 A1 | 8/2009 | |
| WO | WO-2013016404 A1 | 1/2013 | |
| WO | WO-2016196109 A1 | 12/2016 | |
| WO | WO-2017029819 A1 | 2/2017 | |

OTHER PUBLICATIONS

U.S. Appl. No. 16/280,758, filed Feb. 20, 2019, Kirill M. Ignatiev et al.
Clarksean, Randy, "A Phase Change Material Slurry System to Decrease Peak Air Conditioning Loads: Independent Assessment and Final EISG Report." Public Interest Energy Research, California Energy Commission, 2006 (81 pages).
CA Notice of Allowance regarding U.S. Appl. No. 16/412,838, dated Dec. 13, 2019.
Office Action regarding Chinese Patent Application No. 201680066979. X, dated Oct. 18, 2019. Translation provided by Unitalen Attorneys at Law.
International Search Report regarding International Application No. PCT/US2019/039304, dated Oct. 22, 2019.
Written Opinion of the International Searching Authority regarding International Application No. PCT/US2019/039304, dated Oct. 22, 2019.
International Search Report of the ISA/KR regarding International Application No. PCT/US2019/019216 dated Jun. 3, 2019.
Written Opinion of the ISA/KR regarding International Application No. PCT/US2019/019216 dated Jun. 3, 2019.
International Search Report regarding Internatonal Application No. PCT/US2019/016518 dated May 21, 2019.
Written Opinion of the ISA/KR regarding International Application No. PCT/US2019/016518 dated May 21, 2019.
U.S. Appl. No. 16/412,838, filed May 15, 2019, Babak Attari et al.
U.S. Appl. No. 16/447,468, filed Jun. 20, 2019, Frank S. Wallis et al.
International Search Report regarding International Application No. PCT/US2014/036592, dated Sep. 1, 2014.
Written Opinion of the International Searching Authority regarding International Application No. PCT/US2014/036592, dated Sep. 1, 2014.
Office Action regarding U.S. Appl. No. 14/267,224, dated Nov. 24, 2015.
Notice of Allowance regarding U.S. Appl. No. 14/267,224, dated Mar. 16, 2016.
Office Action regarding Chinese Patent Application No. 201480024924. 3, dated Sep. 20, 2016. Translation provided by Unitalen Attorneys at Law.
Search Report regarding European Patent Application No. 14791184. 6, dated Nov. 14, 2016.
International Search Report regarding International Application No. PCT/US2016/060990, dated Feb. 7, 2017.
Written Opinion of the International Searching Authority regarding International Application No. PCT/US2016/060990, dated Feb. 7, 2017.
Office Action regarding Chinese Patent Application No. 201480024924. 3, dated Jun. 19, 2017. Translation provided by Unitalen Attorneys at Law.
Restriction Requirement regarding U.S. Appl. No. 15/339,012, dated Sep. 28, 2018.
Office Action regarding U.S. Appl. No. 15/339,012, dated Jan. 9, 2019.
Office Action regarding U.S. Appl. No. 15/339,012, dated Jun. 26, 2019.

(56) References Cited

OTHER PUBLICATIONS

Search Report regarding European Patent Application No. 16866861.4, dated Aug. 22, 2019.
International Search Report regarding International Application No. PCT/US2019/032478, dated Sep. 4, 2019.
Written Opinion of the International Searching Authority regarding International Application No. PCT/US2019/032478, dated Sep. 4, 2019.
Notice of Allowance regarding U.S. Appl. No. 15/339,012, dated Sep. 5, 2019.
CA Office Action regarding Chinese Patent Application No. 201680066979.X, dated May 29, 2020.
Office Action regarding European Patent Application No. 14791184.6, dated Sep. 29, 2020.
Restriction Requirement regarding U.S. Appl. No. 16/447,468, dated Oct. 1, 2020.
Notice of Allowance regarding U.S. Appl. No. 16/280,758 dated Jul. 1, 2021.
Non-Final Office Action regarding U.S. Appl. No. 16/447,468 dated Aug. 5, 2021.
Office Action regarding U.S. Appl. No. 16/280,758, dated Mar. 4, 2021.
Office Action regarding Chinese Patent Application No. 201980016759.X, dated Apr. 2, 2021. Translation provided by Unitalen Attorneys at Law.
Extended European Search Report regarding Application No. 19748107.0 dated Oct. 11, 2021.
First Chinese Office Action regarding Application No. 201980021446.3 dated Jul. 5, 2021. English translation provided by Unitalen Attorneys at Law.
Extended European Search Report regarding Application No. 19756778.7 dated Oct. 28, 2021.
First Chinese Office Action regarding Application No. 201980042749.3 dated Oct. 8, 2021. English translation provided by Unitalen Attorneys at Law.

* cited by examiner

CLIMATE-CONTROL SYSTEM HAVING THERMAL STORAGE TANK

CROSS-REFERENCE TO RELATED APPLICATIONS

This application claims the benefit of U.S. Provisional Application No. 62/626,367, filed on Feb. 5, 2018. The entire disclosure of the above application is incorporated herein by reference.

FIELD

The present disclosure relates to a climate-control system having a thermal storage tank.

BACKGROUND

This section provides background information related to the present disclosure and is not necessarily prior art.

A climate-control system such as, for example, a heat-pump system, a refrigeration system, or an air conditioning system, may include a fluid circuit having an outdoor heat exchanger, one or more indoor heat exchangers, one or more expansion devices, and one or more compressors circulating a working fluid (e.g., refrigerant or carbon dioxide) through the fluid circuit. Efficient and reliable operation of the climate control system is desirable to ensure that the climate-control system is capable of effectively and efficiently providing a cooling and/or heating effect on demand.

SUMMARY

This section provides a general summary of the disclosure, and is not a comprehensive disclosure of its full scope or all of its features.

In one form, a climate-control system may include a first working fluid circuit, a second working fluid circuit and a storage tank. The first working fluid circuit includes a first compressor and a first heat exchanger in fluid communication with the first compressor. The second working fluid circuit includes a second compressor and a second heat exchanger in fluid communication with the second compressor. The storage tank contains a phase-change material. The first working fluid circuit and the second working fluid circuit thermally coupled with the phase-change material contained in the storage tank.

In some configurations of the climate-control system of the above paragraph, the first working fluid circuit and the second working fluid circuit are fluidly isolated from each other and from the phase-change material contained in the storage tank.

In some configurations of the climate-control system of either of the above paragraphs, the first working fluid circuit includes a conduit and the second working fluid circuit includes a conduit. The conduit of the first working fluid circuit and the conduit of the second working fluid circuit may be disposed within the storage tank.

In some configurations of the climate-control system of any of the above paragraphs, the first working fluid circuit includes a plurality of conduits and the second working fluid circuit includes a plurality of conduits. The plurality of conduits of the first working fluid circuit and the plurality of conduits of the second working fluid circuit may be disposed within the storage tank.

In some configurations of the climate-control system of any of the above paragraphs, the first working fluid circuit includes a first expansion device disposed between the first heat exchanger of the first working fluid circuit and the conduit of the first working fluid circuit.

In some configurations of the climate-control system of any of the above paragraphs, the second working fluid circuit includes a first loop and a second loop. The first loop and the second loop are in fluid communication with the conduit of the second working fluid circuit.

In some configurations of the climate-control system of any of the above paragraphs, the first loop includes the second compressor, the second heat exchanger and a second expansion device. The second expansion device of the first loop may be disposed between the conduit of the second working fluid circuit and the second heat exchanger of the first loop.

In some configurations of the climate-control system of any of the above paragraphs, the second loop includes a third compressor, a third heat exchanger and a third expansion device. The third expansion device of the second loop may be disposed between the conduit of the second working fluid circuit and the third heat exchanger of the second loop.

In some configurations of the climate-control system of any of the above paragraphs, the second heat exchanger of the first loop is a medium- temperature evaporator, and the third heat exchanger of the second loop is a low-temperature evaporator.

In some configurations of the climate-control system of any of the above paragraphs, the second working fluid circuit includes a third loop. The third loop may be in fluid communication with the conduit of the second working fluid circuit.

In some configurations of the climate-control system of any of the above paragraphs, the third loop includes a fourth heat exchanger and a pump. The pump may be disposed between the conduit of the second working fluid circuit and the fourth heat exchanger of the third loop.

In some configurations of the climate-control system of any of the above paragraphs, the fourth heat exchanger of the third loop is a high-temperature evaporator.

In some configurations of the climate-control system of any of the above paragraphs, a first working fluid circulates through the first working fluid circuit and a second working fluid circulates through the second working fluid circuit. The first working fluid and the second working fluid may be different fluids.

In another form, a climate-control system may include a first working fluid circuit, a second working fluid circuit and a storage tank. The first working fluid circuit includes a first compressor and a condenser in fluid communication with the first compressor. The second working fluid circuit includes a second compressor and a first evaporator in fluid communication with the second compressor. The storage tank contains a phase-change material. The first working fluid circuit and the second working fluid circuit thermally coupled with the phase-change material contained in the storage tank.

In some configurations of the climate-control system of the above paragraph, the first working fluid circuit and the second working fluid circuit are fluidly isolated from each other and from the phase-change material contained in the storage tank.

In some configurations of the climate-control system of either of the above paragraphs, the first working fluid circuit includes a conduit and the second working fluid circuit includes a conduit. The conduit of the first working fluid circuit and the conduit of the second working fluid circuit may be disposed within the storage tank.

In some configurations of the climate-control system of any of the above paragraphs, the first working fluid circuit includes a plurality of conduits and the second working fluid circuit includes a plurality of conduits. The plurality of conduits of the first working fluid circuit and the plurality of conduits of the second working fluid circuit may be disposed within the storage tank.

In some configurations of the climate-control system of any of the above paragraphs, the second working fluid circuit includes a first loop and a second loop. The first loop and the second loop may be in fluid communication with the conduit of the second working fluid circuit.

In some configurations of the climate-control system of any of the above paragraphs, the first loop includes the second compressor, the first evaporator and a first expansion device. The first expansion device of the first loop may be disposed between the conduit of the second working fluid circuit and the first evaporator of the first loop.

In some configurations of the climate-control system of any of the above paragraphs, the second loop includes a third compressor, a second evaporator and a second expansion device. The second expansion device of the second loop may be disposed between the conduit of the second working fluid circuit and the second evaporator of the second loop.

In some configurations of the climate-control system of any of the above paragraphs, the second working fluid circuit includes a third loop. The third loop may be in fluid communication with the conduit of the second working fluid circuit.

In some configurations of the climate-control system of any of the above paragraphs, the third loop includes a third evaporator and a pump. The pump may be disposed between the conduit of the second working fluid circuit and the third evaporator of the third loop.

In some configurations of the climate-control system of any of the above paragraphs, the first evaporator of the first loop is a medium-temperature evaporator, the second evaporator of the second loop is a low-temperature evaporator, and the third evaporator of the third loop is a high-temperature evaporator.

In some configurations of the climate-control system of any of the above paragraphs, a first working fluid circulates through the first working fluid circuit and a second working fluid circulates through the second working fluid circuit, and wherein the first working fluid and the second working fluid are different fluids.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
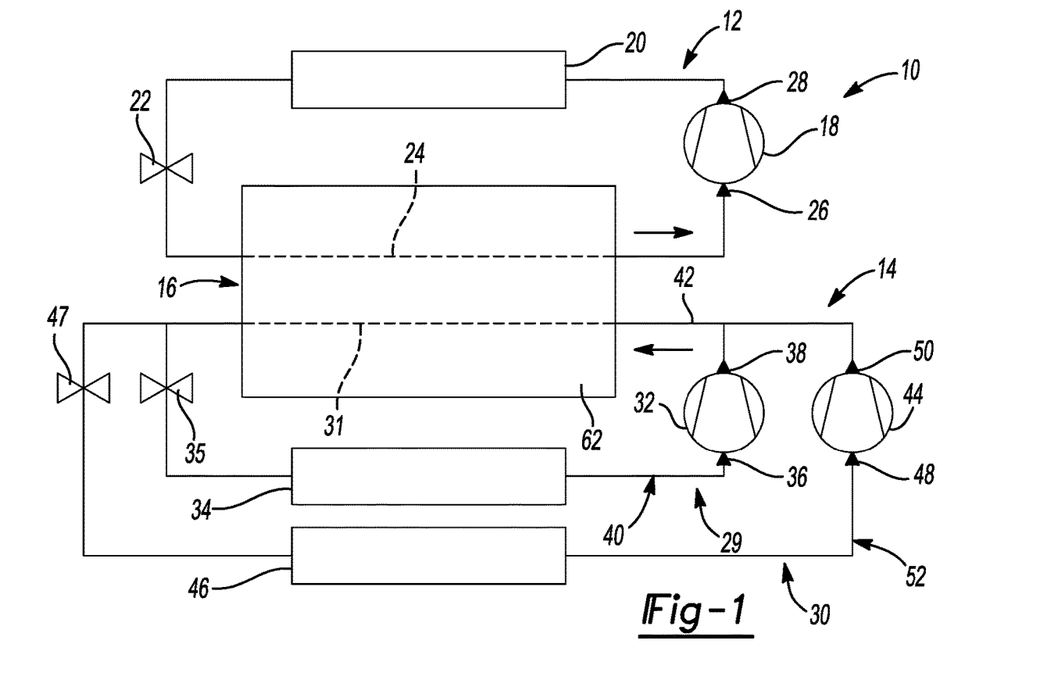
FIG. 1 is a schematic representation of a climate-control system according to the principles of the present disclosure.

With reference to FIG. 1, a climate-control system 10 is provided that may be operable between a full-charge mode (i.e., ice-making mode), a discharge mode (i.e., ice-melting mode), a partial charge mode (i.e., ice-making mode while providing required cooling) and a charge-neutral mode. The climate-control system 10 may include a first working fluid circuit 12, a second working fluid circuit 14, and a thermal storage tank 16. The first working fluid circuit 12 and the second working fluid circuit 14 may be in a heat transfer relationship (i.e., thermally coupled) with each other and with the thermal storage tank 16. The first working fluid circuit 12 and the second working fluid circuit 14 may also be fluidly isolated from each other and the thermal storage tank 16.

The first working fluid circuit 12 may include a compressor 18, a heat exchanger 20 (an outdoor heat exchanger such as a condenser or gas cooler, for example), an expansion device 22 and a conduit 24. The compressor 18 may pump a first working fluid (e.g., a natural refrigerant such as ammonia, for example) through the first working fluid circuit 12. The compressor 18 could be a scroll compressor, for example, or any other type of compressor such as reciprocating or rotary vane compressor, for example. The compressor 18 may be a variable-capacity compressor operable in full capacity mode and a reduced capacity mode. In some configurations, the compressor 18 could include additional or alternative capacity modulation capabilities (e.g., variable speed motor, vapor injection, blocked suction, etc.).

The compressor 18 may include an inlet 26 and an outlet 28. The inlet 26 may receive the first working fluid from the conduit 24. The first working fluid received through the inlet 26 may be compressed in the compressor 18 and may be discharged through the outlet 28 to the heat exchanger 20.

The heat exchanger 20 may receive the compressed first working fluid from the compressor 18 and may transfer heat from the first working fluid to ambient air that may be forced over the heat exchanger 20 by a fan (not shown). In some configurations, the heat exchanger 20 may transfer heat from the compressed first working fluid to a stream of liquid such as water, for example. From the heat exchanger 20, the first working fluid may flow through the expansion device 22 (e.g., an expansion valve or capillary tube), thereby lowering the temperature and pressure of the first working fluid. From the expansion device 22, the first working fluid may flow into the conduit 24 disposed within the thermal storage tank 16.

The conduit 24 may be disposed within and extend through the thermal storage tank 16 such that the conduit 24 is in a heat transfer relationship (i.e., thermally coupled) with the second working fluid circuit 14 and the thermal storage tank 16. That is, the first working fluid flowing through the conduit 24 may absorb heat from the thermal storage tank 16 and the second working fluid circuit 14 based on the mode of the system 10.

The second working fluid circuit 14 may include a first loop 29 (e.g., a first working fluid flow path), a second loop 30 (e.g., a second working fluid flow path) and a conduit 31. A second working fluid (e.g., a natural refrigerant such as carbon dioxide, for example) may circulate throughout the second working fluid circuit 14. The first loop 29 is in fluid communication with the conduit 31 and may include a compressor 32, a heat exchanger 34 and an expansion device 35.

The compressor 32 may compress and circulate the second working fluid through the first loop 29 of the second working fluid circuit 14. The compressor 32 could be a scroll compressor, for example, or any other type of compressor such as reciprocating or rotary vane compressors, for example. The compressor 32 may be a variable-capacity compressor operable in full capacity mode and a reduced capacity mode. In some configurations, the compressor 32 could include additional or alternative capacity modulation capabilities (e.g., variable speed motor, vapor injection, blocked suction, etc.).

The compressor 32 may include an inlet 36 and an outlet 38. The inlet 36 may receive the second working fluid from a fluid passageway 40 extending between the heat exchanger 34 and the compressor 32. The second working fluid may be compressed in the compressor 32 and may be discharged through the outlet 38 to the conduit 31 via an inlet line 42.

The heat exchanger 34 may be an indoor heat exchanger such as a medium-temperature evaporator (e.g., at or around 23 degrees Fahrenheit, for example). The heat exchanger 34 may selectively receive the second working fluid from the conduit 31 via the expansion device 35 (e.g., an expansion valve or capillary tube). The expansion device 35 may be disposed between the conduit 31 and the heat exchanger 34 and may control fluid flow from the conduit 31 to the heat exchanger 34. The second working fluid in the heat exchanger 34 may absorb heat from a first space to be cooled (e.g., an interior of a refrigerator, a refrigerated display case, or a cooler). From the heat exchanger 34, the second working fluid may flow into the fluid passageway 40 and subsequently back into the compressor 32 through the inlet 36.

The second loop 30 is in fluid communication with the conduit 31 and may include a compressor 44, a heat exchanger 46 and an expansion device 47. The compressor 44 may compress and circulate the second working fluid through the second loop 30 of the second working fluid circuit 14. The compressor 44 could be a scroll compressor, for example, or any other type of compressor such as reciprocating or rotary vane compressors, for example. The compressor 44 may be a variable-capacity compressor operable in full capacity mode and a reduced capacity mode. In some configurations, the compressor 44 could include additional or alternative capacity modulation capabilities (e.g., variable speed motor, vapor injection, blocked suction, etc.).

The compressor 44 may include an inlet 48 and an outlet 50. The inlet 48 may receive the second working fluid from a fluid passageway 52 extending between the heat exchanger 46 and the compressor 44. The second working fluid in the fluid passageway 52 may be at a lower temperature than the second working fluid in the fluid passageway 40. The second working fluid flowing through the fluid passageway 52 may be compressed in the compressor 44 and may be discharged through the outlet 50 to the conduit 31 via the inlet line 42.

The heat exchanger 46 may be an indoor heat exchanger such as a low-temperature evaporator (e.g., at or around −20 degrees Fahrenheit, for example). The heat exchanger 46 may selectively receive the second working fluid from the conduit 31 via the expansion device 47 (e.g., an expansion valve or capillary tube). The expansion device 47 may be disposed between the conduit 31 and the heat exchanger 46 and may control fluid flow from the conduit 31 to the heat exchanger 46. The second working fluid in the heat exchanger 46 may absorb heat from a second space to be cooled (e.g., freezer or a frozen food display case). In some configurations, the second working fluid in the heat exchanger 34 of the first loop 29 and the second working fluid in the heat exchanger 46 of the second loop 30 may absorb heat from the same space (e.g., the heat exchanger 34 of the first loop 29 and the heat exchanger 46 of the second loop 30 may operate at different times to switch the space between a freezer and a cooler, for example). From the heat exchanger 46, the second working fluid may flow into the fluid passageway 52 and subsequently back into the compressor 44 through the inlet 48.

The conduit 31 may be disposed within and extend through the thermal storage tank 16 such that the conduit 31 is in a heat transfer relationship (i.e., thermally coupled) with the conduit 24 of the first working fluid circuit 12 and the thermal storage tank 16. That is, the second working fluid flowing through the conduit 31 transfers heat to the thermal storage tank 16 and the conduit 24 of the first working fluid circuit 12 based on the mode of the system 10.

The thermal storage tank 16 may define a chamber filled with a phase-change material 62 such as water or glycol, for example. The phase-change material 62 within the thermal storage tank 16 may be in the form of ice, for example, that is usable by the climate control system 10. In some configurations, additives such as alcohol or calcium chloride ($CaCl_2$) may be mixed into the phase-change material 62 to vary (e.g., raise or lower) the temperature at which the phase-change occurs.

With continued reference to FIG. 1, operation of the climate-control system 10 in the full-charge mode (i.e., ice-making mode), the discharge mode (i.e., ice-melting mode), the partial charge mode (i.e., ice-making mode while providing while providing required cooling), and the charge-neutral mode will be described in detail. In the full-charge mode, the compressors 32, 44 of the second working fluid circuit 14 may be shut down and the compressor 18 of the first working fluid circuit 12 may operate to circulate working fluid through the first working fluid circuit 12. The high-pressure first working fluid discharged from the compressor 18 is cooled in the heat exchanger 20 by transferring heat from the first working fluid to ambient air or another cooling medium (e.g., water). From the heat exchanger 20, the first working fluid flows through the expansion device 22, thereby lowering the temperature and pressure of the first working fluid prior to entering into the conduit 24. The first working fluid in the conduit 24 absorbs heat from the phase-change material 62 contained in the thermal storage tank 16, which cools the phase-change material 62 and may turn the phase-change material 62 into a solid (i.e., ice). The first working fluid circuit 12 can operate to reduce the temperature of the phase-change material 62 within the thermal storage tank 16 at times when the cost of electricity is low (e.g., at night). It should be understood, however, that the first working fluid circuit 12 can operate during the day (e.g., cycling the first working fluid circuit 12 on and off) to cool the phase-change material 62 within the thermal storage tank 16, if necessary. From the conduit 24, the first working fluid flows back into the compressor 18 through the inlet 26.

In the discharge mode, the compressor 18 in the first working fluid circuit 12 may be shut down and one or both of the compressors 32, 44 may operate to circulate the second working fluid in the second working fluid circuit 14 through the first loop 29 and/or the second loop 30. When flowing through the first loop 29 of the second working fluid circuit 14, the second working fluid is compressed in the compressor 32 and discharged through the outlet 38 to the conduit 31 via the inlet line 42. The second working fluid flowing through the conduit 31 via the compressor 32 transfers heat to the phase-change material 62 contained in the thermal storage tank 16. This, in turn, cools the second working fluid prior to the second working fluid entering into the heat exchanger 34 via the expansion device 35. The second working fluid flowing through the heat exchanger 34 absorbs heat from the first space (e.g., the cooler) to be cooled. From the heat exchanger 34, the second working fluid flows back to the compressor 32 via the fluid passageway 40 and the inlet 36.

When flowing through the second loop 30 of the second working fluid circuit 14, the second working fluid is compressed in the compressor 44 and discharged through the outlet 50 to the conduit 31 via the inlet line 42. The second working fluid flowing through the conduit 31 via the compressor 44 dumps heat to the phase-change material 62 contained in the thermal storage tank 16. This, in turn, cools the second working fluid prior to the second working fluid entering into the heat exchanger 46 via the expansion device 47. The second working fluid flowing through the heat exchanger 46 absorbs heat from the second space (e.g., the freezer) to be cooled. From the heat exchanger 46, the second working fluid flows back to the compressor 44 via the fluid passageway 52 and the inlet 48. The second working fluid in the fluid passageway 52 may be at a lower temperature then the second working fluid in the fluid passageway 40.

In the partial charge mode, the compressor 18 of the first working fluid circuit 12 may operate to circulate the first working fluid through the conduit 24 in a similar manner as described above (i.e., when the system 10 is in the full-charge mode) and the one or both of the compressors 32, 44 of the second working fluid circuit 14 may operate to circulate the second working fluid through the conduit 31 in a similar manner as described above (i.e., when the system 10 is in the discharge mode). In this mode, the first working fluid in the conduit 24 of the first working fluid circuit 12 absorbs heat from the phase-change material 62 contained in the thermal storage tank 16 at a faster rate than the second working fluid in the conduit 31 of the second working fluid circuit 14 is transferring heat to the phase-change material 62 contained in the thermal storage tank 16 such that the system 10 is charging while still providing the required cooling to the space or spaces to be cooled. In other words, heat is being added to the phase-change material 62 by the second working fluid circuit 14 at a slower rate than heat is being removed from the phase-change material 62 by the first working fluid circuit 12, thereby cooling the phase-change material 62.

In the charge-neutral mode, the compressor 18 of the first working fluid circuit 12 may operate to circulate the first working fluid through the conduit 24 in the manner described above (i.e., when the system 10 is in the full-charge mode) and the one or both of the compressors 32, 44 of the second working fluid circuit 14 may operate to circulate the second working fluid through the conduit 31 in the manner described above (i.e., when the system 10 is in the discharge mode). In this way, the first working fluid in the conduit 24 of the first working fluid circuit 12 absorbs heat from the phase-change material 62 contained in the thermal storage tank 16 and the second working fluid in the conduit 31 of the second working fluid circuit 14 transfers heat to the phase-change material 62 contained in the thermal storage tank 16 and to the first working fluid in the conduit 24 of the first working fluid circuit 12 so that no net energy is transferred (i.e., charge neutral) between the first and second working fluid circuits 12, 14 and the phase-change material 62 contained in the thermal storage tank 16. In other words, heat is being added to the phase-change material 62 by the second working fluid circuit 14 at the same rate that heat is being removed from the phase-change material 62 by the first working fluid circuit 12.

One of the benefits of the climate-control system 10 of the present disclosure is that the thermal storage tank 16 can be used with working fluid circuits having multiple evaporators that operate at different evaporating temperatures (e.g., applications wherein the climate-control system 10 is controlling the temperatures of a cooler and a freezer). Another benefit of the climate-control system 10 of the present disclosure is that the first working fluid circuit 12 can be operated during low—electricity—cost times to cool the phase-change material 62 so that the first working fluid circuit 12 does not need to be operated (or operated as much) during high—electricity—cost times, thereby reducing overall cost of operating the climate control system 10.

Figure 2:
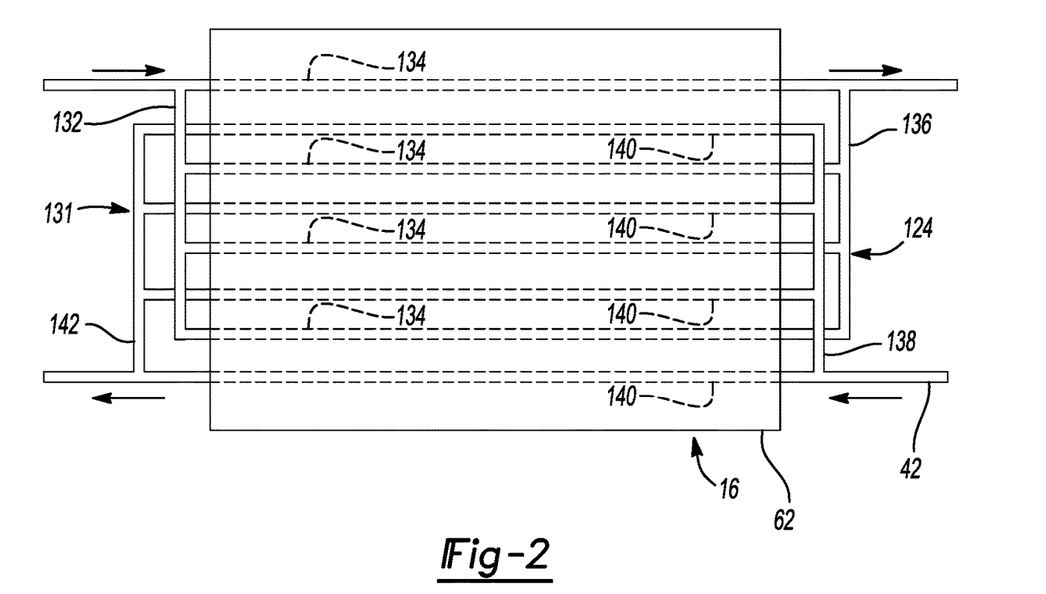
FIG. 2 is schematic representation of another storage tank that can be incorporated into the climate-control system of FIG. 1.

With reference to FIG. 2, a conduit unit 124 and a conduit unit 131 are provided that may be incorporated into the climate control system 10 instead of the conduit 24 of the first working fluid circuit 12 and the conduit 31 of the second working fluid circuit 14, respectively. The structure and function of the conduit unit 124 and the conduit unit 131 may be similar or identical to that of the conduit 24 and the conduit 31, apart from any exceptions described below.

As shown in FIG. 2, the conduit unit 124 may include a first header 132, a plurality of conduits 134 and a second header 136. The first header 132 may be in fluid communication with the expansion device 22 and the plurality of conduits 134. The first header 132 may receive the first working fluid from the expansion device 22 and distribute the first working fluid through the plurality of conduits 134. The plurality of conduits 134 may be disposed in and extend through the chamber (i.e., the chamber containing the phase-change material 62) of the thermal storage tank 16 and may be in a heat transfer relationship (i.e., thermally coupled) with the phase-change material 62 in the thermal storage tank 16 and the conduit unit 131. The plurality of conduits 134 may also be in fluid communication with the second header 136. The second header 136 may be in fluid communication with the compressor 18. The second header 136 may receive the first working fluid from the plurality of conduits 134 and direct the first working fluid back to the compressor 18.

The conduit unit 131 may include a first header 138, a plurality of conduits 140 and a second header 142. The first header 138 may be in fluid communication with the inlet line 42 and the plurality of conduits 140. The first header 138 may receive the second working fluid from the inlet line 42 and distribute the second working fluid to the plurality of conduits 140. The plurality of conduits 140 may be disposed in and extend through the chamber (i.e., the chamber containing the phase-change material 62) of the thermal storage tank 16 and may be in a heat transfer relationship (i.e., thermally coupled) with the phase-change material 62 in the thermal storage tank 16 and the plurality of conduits 134 of the conduit unit 124. The plurality of conduits 140 may also be in fluid communication with the second header 142. The second header 142 may be in fluid communication with the first loop 29 and the second loop 30. The second header 142 may receive the second working fluid from the plurality of conduits 140 and direct the second working fluid to the first loop 29 and/or the second loop 30.

Figure 3:
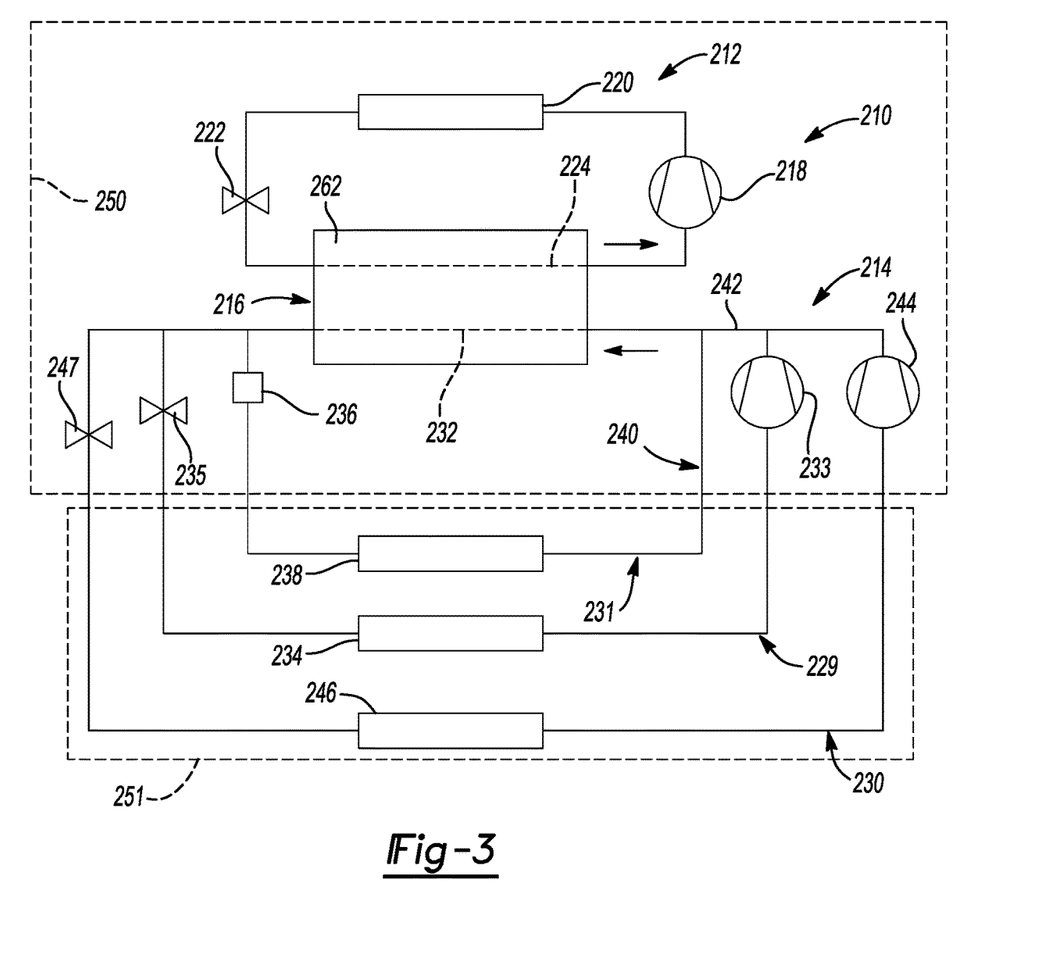
FIG. 3 is schematic representation of another climate-control system.

With reference to FIG. 3, another climate-control system 210 is provided that may be generally similar to the climate-control system 10 described above, apart from any exception noted below. The climate-control system 210 may be operable between a charge mode (i.e., ice-making mode), a discharge mode (i.e., ice-melting mode), a partial charge mode (i.e., ice-making mode while providing requiring cooling) and a charge-neutral mode and may include a first working fluid circuit 212, a second working fluid circuit 214, and a thermal storage tank 216. The first working fluid circuit 212 and the second working fluid circuit 214 may be in a heat transfer relationship (i.e., thermally coupled) with each other and with the thermal storage tank 216. The first working fluid circuit 212 and the second working fluid circuit 214 may also be fluidly isolated from each other and the thermal storage tank 216.

The first working fluid circuit 212 may include a compressor 218, a heat exchanger 220 (an outdoor heat exchanger such as a condenser or gas cooler, for example), an expansion device 222 and a conduit 224. A first working fluid (e.g., a natural refrigerant such as ammonia, for example) may circulate throughout the first working fluid circuit 212. The structure and function of the compressor 218, the heat exchanger 220, the expansion device 222 and the conduit 224 may be similar or identical to that of the compressor 18, the heat exchanger 20, the expansion device 22 and the conduit 24 (or conduit unit 124), respectively, described above, and therefore, will not be described again in detail.

The second working fluid circuit 214 may include a first loop 229 (e.g., a first working fluid flow path), a second loop 230 (e.g., a second working fluid flow path), a third loop 231 (e.g., a third working fluid flow path) and a conduit 232. A second working fluid (e.g., a natural refrigerant such as carbon dioxide, for example) may circulate throughout the second working fluid circuit 214. The first loop 229 may be in fluid communication with the conduit 232 and may include a compressor 233, a heat exchanger 234 (an indoor heat exchanger such as a medium-temperature evaporator, for example) and an expansion device 235. The heat exchanger 234 may be an indoor heat exchanger such as a medium-temperature evaporator (e.g., at or around 23 degrees Fahrenheit, for example). The structure and function of the compressor 233, the heat exchanger 234 and the expansion device 235 may be similar or identical to that of the compressor 32, the heat exchanger 34, and the expansion device 35, respectively, described above, and therefore, will not be described again in detail. The second loop 230 may be in fluid communication with the conduit 232 and may include a compressor 244, a heat exchanger 246, and an expansion device 247. The heat exchanger 246 may be an indoor heat exchanger such as a low-temperature evaporator (e.g., at or around −20 degrees Fahrenheit, for example). The structure and function of the compressor 244, the heat exchanger 246 and the expansion device 247 may be similar or identical to that of the compressor 44, the heat exchanger 46 and the expansion device 47, respectively, described above, and therefore, will also not be described again in detail.

The third loop 231 may be in fluid communication with the conduit 232 and may include a pump 236 and a heat exchanger 238. The pump 236 may be disposed between the conduit 232 and the heat exchanger 238 and may circulate the second working fluid through the third loop 231 of the second working fluid circuit 214. The heat exchanger 238 may be an indoor heat exchanger such as a high-temperature evaporator (e.g., at or around 45 degrees Fahrenheit for air conditioning in a home or building, for example). The heat exchanger 238 may selectively receive the second working fluid from the conduit 232 via the pump 236. The second working fluid in the heat exchanger 238 may absorb heat from a third space to be cooled (e.g., an air-conditioned room). In some configurations, the second working fluid flowing through the heat exchanger 238 of the third loop 231 and the heat exchangers 234, 246 of the first loop 229 and the second loop 230, respectively, may absorb heat from the same space (e.g., the heat exchangers 234, 246, 238 of the first, second and third loops 229, 230, 231, respectively, may operate at different times to switch the space between a freezer, a cooler, and an air-conditioned room). The heat exchangers 234, 246, 238 of the first, second, and third loops 229, 230, 231 may be disposed indoors 251 while the remaining components of the climate-control system 210 (i.e., the compressor 218, the heat exchanger 220, the expansion device 222 and the conduit 224 of the first working fluid circuit 212; the compressors 233, 244, the expansion devices 235, 247, the pump 236 and the conduit 232 of the second working fluid circuit 214; and the thermal storage unit 216) are disposed outdoors 250. From the heat exchanger 238, the second working fluid may flow into a fluid passageway 240 and subsequently back into the conduit 232 via an inlet line 242.

The structure and function of the conduit 232 of the second working fluid circuit 214 may be similar or identical to that of the conduit 31 of the second working fluid circuit 14 or the conduit unit 131 described above, and therefore, will not be described again in detail. The structure and function of the thermal storage tank 216 may also be similar or identical to that of the thermal storage tank 16 described above, and therefore, will not be described again in detail.

With continued reference to FIG. 3, operation of the climate-control system 210 will be described. Operation of the climate-control system 210 in the charge mode (i.e., ice-making mode) may be similar or identical to that of the climate-control system 10 described above in the charge mode, and therefore, will not be described again in detail.

In the discharge mode (i.e., ice-melting mode), the compressor 218 in the first working fluid circuit 212 may be shut down and one or both of the compressors 233, 244 and/or the pump 236 may operate to circulate the second working fluid in the second working fluid circuit 214 through the first loop 229, the second loop 230 and/or the third loop 231. Circulating the second working fluid through the first loop 229 and the second loop 230 of the second working fluid circuit 214 may be similar or identical to circulating the second working fluid through the first and second loops 29, 30 of the second working fluid circuit 14 described above, and therefore, will not be described again in detail. When flowing through the third loop 231 of the second working fluid circuit 214, the second working fluid is pumped to the heat exchanger 238 by the pump 236 where the second working fluid absorbs heat from the third space (e.g., air-conditioned room). From the heat exchanger 238, the second working fluid flows into the conduit 232 via the fluid passageway 240 and the inlet line 242. The second working fluid in the conduit 232 transfers heat to a phase-change material 262 contained in the thermal storage tank 216, which in turn, cools the second working fluid. The second working fluid exits the conduit 232 and flows back to the pump 236.

In the partial charge mode, the compressor 218 of the first working fluid circuit 212 may operate to circulate the first working fluid through the conduit 224 in a similar manner as described above (i.e., when the system 210 is in the full-charge mode) and the one or both of the compressors 233, 244 and/or the pump 236 may operate to circulate the second working fluid through the conduit 232 in a similar manner as described above (i.e., when the system 210 is in the discharge mode). In this mode, the first working fluid in the conduit 224 of the first working fluid circuit 212 absorbs heat from the phase-change material 262 contained in the thermal storage tank 216 at a faster rate than the second working fluid in the conduit 232 of the second working fluid circuit 214 is transferring heat to the phase-change material 262 contained in the thermal storage tank 216 such that the system 210 is charging while still providing the required cooling to the space or spaces to be cooled. In other words, heat is being added to the phase-change material 262 by the second working fluid circuit 214 at a slower rate than heat is being removed from the phase-change material 262 by the first working fluid circuit 212, thereby cooling the phase-change material 262.

In the charge-neutral mode, the compressor 218 of the first working fluid circuit 212 may operate to circulate the first working fluid through the conduit 224 in the manner described above (i.e., when the system 210 is in the charge mode) and the one or both of the compressors 233, 244 and/or the pump 236 may operate to circulate the second working fluid through the conduit 232 in the manner described above (i.e., when the system 210 is in the discharge mode). In this way, the first working fluid in the conduit 224 of the first working fluid circuit 212 absorbs heat from the phase-change material 262 contained in the thermal storage tank 216 and the second working fluid in the conduit 232 of the second working fluid circuit 214 transfers heat to the phase-change material 262 contained in the thermal storage tank 216 and to the first working fluid in the conduit 224 of the first working fluid circuit 212 so that no net energy is transferred (i.e., charge neutral) between the first and second working fluid circuits 212, 214 and the phase-change material 262 contained in the thermal storage tank 216. In other words, heat is being added to the phase-change material 262 by the second working fluid circuit 214 at the same rate that heat is being removed from the phase-change material 262 by the first working fluid circuit 212.

It should be understood that in some configurations, the second working fluid circuit 214 may include the conduit 232, the third loop 231 and one of the first loop 229 and the second loop 230.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A climate-control system comprising:
 a first working fluid circuit including a first compressor and a first heat exchanger, the first heat exchanger in fluid communication with the first compressor;
 a second working fluid circuit including a second compressor and a second heat exchanger, the second heat exchanger in fluid communication with the second compressor; and a storage tank containing a phase-change material, wherein working fluid in the first working fluid circuit is in a heat transfer relationship with the phase-change material in the storage tank, and wherein working fluid in the second working fluid circuit is in a heat transfer relationship with the phase-change material contained in the storage tank, wherein the first working fluid circuit includes a first conduit and the second working fluid circuit includes a second conduit, and wherein the first and second conduits are at least partially disposed within the storage tank, wherein the second working fluid circuit includes a first loop and a second loop, and wherein the first loop and the second loop both receive the working fluid from the second conduit such that working fluid flows from the second conduit to the second loop without flowing through the second compressor, wherein the working fluid flowing through the first loop bypasses the second loop such that working fluid received in the first loop from the second conduit in the storage tank is returned to the second conduit in the storage tank without flowing through the second loop, wherein the working fluid flowing through the second loop bypasses the first loop such that working fluid received in the second loop from the second conduit in the storage tank is returned to the second conduit in the storage tank without flowing through the first loop, and wherein the first and second loops are disposed outside of the storage tank.

2. The climate-control system of claim 1, wherein the working fluid in the first working fluid circuit is fluidly isolated from the working fluid in the second working fluid circuit and fluidly isolated from the phase-change material contained in the storage tank, and wherein the working fluid in the second working fluid circuit is fluidly isolated from the phase-change material contained in the storage tank.

3. The climate-control system of claim 2, wherein the first working fluid circuit includes a plurality of first conduits and the second working fluid circuit includes a plurality of second conduits, and wherein the plurality of first conduits of the first working fluid circuit and the plurality of second conduits of the second working fluid circuit are at least partially disposed within the storage tank.

4. The climate-control system of claim 2, wherein the first working fluid circuit includes a first expansion device disposed between the first heat exchanger of the first working fluid circuit and the first conduit of the first working fluid circuit.

5. The climate-control system of claim 1, wherein the first loop includes the second compressor, the second heat exchanger and a second expansion device, and wherein the second expansion device is disposed between the second conduit of the second working fluid circuit and the second heat exchanger of the first loop.

6. The climate-control system of claim 5, wherein the second loop includes a third compressor, a third heat exchanger and a third expansion device, and wherein the third expansion device of the second loop is disposed between the second conduit of the second working fluid circuit and the third heat exchanger of the second loop.

7. The climate-control system of claim 6, wherein the second heat exchanger of the first loop is a medium-temperature evaporator, and wherein the third heat exchanger of the second loop is a low-temperature evaporator.

8. The climate-control system of claim 6, wherein the second working fluid circuit includes a third loop, and wherein the third loop is in fluid communication with the second conduit of the second working fluid circuit.

9. The climate-control system of claim 8, wherein the third loop includes a fourth heat exchanger and a pump, and wherein the pump is disposed between the second conduit of the second working fluid circuit and the fourth heat exchanger of the third loop.

10. The climate-control system of claim 9, wherein a first working fluid circulates through the first working fluid circuit and a second working fluid circulates through the second working fluid circuit, and wherein the first working fluid and the second working fluid are different fluids.

11. A climate-control system comprising:

a first working fluid circuit including a first compressor and a condenser, the condenser in fluid communication with the first compressor;

a second working fluid circuit including a second compressor and a first evaporator, the first evaporator in fluid communication with the second compressor; and a storage tank containing a phase-change material, wherein working fluid in the first working fluid circuit is in a heat transfer relationship with the phase-change material in the storage tank, and wherein working fluid in the second working fluid circuit is in a heat transfer relationship with the phase-change material contained in the storage tank, wherein the first working fluid circuit includes a first conduit and the second working fluid circuit includes a second conduit, and wherein the first conduit of the first working fluid circuit and the second conduit of the second working fluid circuit are at least partially disposed within the storage tank, wherein the second working fluid circuit includes a first loop and a second loop, wherein the first loop and the second loop are in fluid communication with the second conduit of the second working fluid circuit, wherein the second loop receives working fluid from the second conduit such that working fluid flows from the second conduit to the second loop without flowing through the second compressor, wherein the first loop includes a first expansion device, and wherein the second loop includes a second expansion device, wherein the working fluid flowing through the first loop bypasses the second loop such that working fluid received in the first loop from the second conduit in the storage tank is returned to the second conduit in the storage tank without flowing through the second loop, wherein the working fluid flowing through the second loop bypasses the first loop such that working fluid received in the second loop from the second conduit in the storage tank is returned to the second conduit in the storage tank without flowing through the first loop, and wherein the first and second loops are disposed outside of the storage tank.

12. The climate-control system of claim 11, wherein the working fluid in the first working fluid circuit is fluidly isolated from the working fluid in the second working fluid circuit and fluidly isolated from the phase-change material contained in the storage tank, and wherein the working fluid in the second working fluid circuit is fluidly isolated from the phase-change material contained in the storage tank.

13. The climate-control system of claim 12, wherein the first working fluid circuit includes a plurality of first conduits and the second working fluid circuit includes a plurality of second conduits, and wherein the plurality of first conduits of the first working fluid circuit and the plurality of second conduits of the second working fluid circuit are at least partially disposed within the storage tank.

14. The climate-control system of claim 11, wherein the first loop includes the second compressor, the first evaporator and the first expansion device, and wherein the first expansion device of the first loop is disposed between the second conduit of the second working fluid circuit and the first evaporator of the first loop.

15. The climate-control system of claim 14, wherein the second loop includes a third compressor, a second evaporator and the second expansion device, and wherein the second expansion device of the second loop is disposed between the second conduit of the second working fluid circuit and the second evaporator of the second loop.

16. The climate-control system of claim 15, wherein the second working fluid circuit includes a third loop, and wherein the third loop is in fluid communication with the second conduit of the second working fluid circuit.

17. The climate-control system of claim 16, wherein the third loop includes a third evaporator and a pump, and wherein the pump is disposed between the second conduit of the second working fluid circuit and the third evaporator of the third loop.

18. The climate-control system of claim 17, wherein the first evaporator of the first loop is a medium-temperature evaporator, wherein the second evaporator of the second loop is a low-temperature evaporator, and wherein the third evaporator of the third loop is a high-temperature evaporator.

19. The climate-control system of claim 18, wherein a first working fluid circulates through the first working fluid circuit and a second working fluid circulates through the second working fluid circuit, and wherein the first working fluid and the second working fluid are different fluids.

* * * * *